A. F. Cushman,
Scroll Chuck,

Nº 50,691.          Patented Oct. 31, 1865.

Witnesses
Wm Trewrn
C. L. E. Topliff

Inventor
A. F. Cushman
By Munn & Co
attys

UNITED STATES PATENT OFFICE.

A. F. CUSHMAN, OF HARTFORD, CONNECTICUT.

IMPROVEMENT IN SCROLL-CHUCKS.

Specification forming part of Letters Patent No. 50,691, dated October 31, 1865.

*To all whom it may concern:*

Be it known that I, A. F. CUSHMAN, of Hartford, in the county of Hartford and State of Connecticut, have invented a new and Improved Scroll-Chuck; and I do hereby declare that the following is a full, clear, and exact description thereof, which will enable others skilled in the art to make and use the same, reference being had to the accompanying drawings, forming part of this specification, in which—

Figure 1:
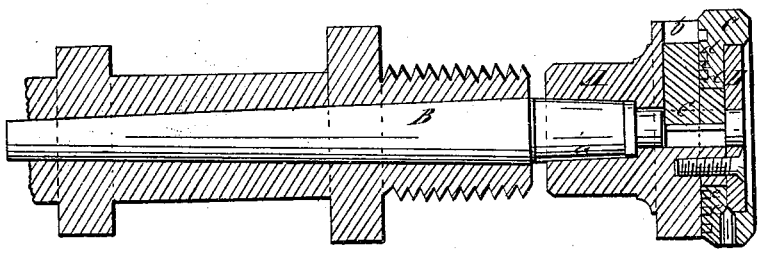
Figure 2:
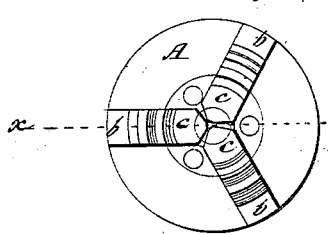
Figure 3:
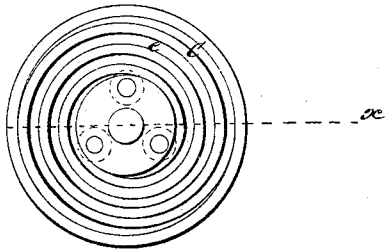

Figure 1 represents a longitudinal central section of this invention, the line $x\ x$, Figs. 2 and 3, indicating the place of section. Fig. 2 is a face view of the same when the cap is removed, so as to expose the jaws with the teeth cut in their upper front surfaces. Fig. 3 is an inverted-plan or inside view of the scroll-cap, by means of which the jaws are moved in and out.

Similar letters of reference indicate corresponding parts.

The nature of my invention consists in making the movable jaws of L shape and applying the teeth which engage with the scroll to the front face of the upper or stem portion of said jaws, so that the power which is applied to force the jaws together, shall be applied as near as possible in line with the center of bearing of said jaws upon the article held between them, for the purpose of preventing the jaws from tilting or binding in their seats, and thereby insure their working free and easy and holding the article true and steady.

A represents the main body or head of a scroll-chuck, which is provided with a central hole, $a$, bored out tapering at its back, so as to fit to the outer tapering end of the center or mandrel B. This center is made to fit into the spindle of an ordinary turning-lathe in the usual manner, and by combining the chuck with the center the time required to secure the chuck in the proper working position is considerably reduced, and much labor and time is saved, particularly in executing small work, such as turning small screws or other small articles, or drilling small holes of various sizes.

The head A of my chuck is provided with three (more or less) radial grooves $b$, which form the guides for the jaws $c$. These jaws are made L-shaped, and on the front face of their outer or stem portion several teeth are made of a proper size to fit into the grooves of the scroll $e$, cut in the back side of disk C, so that when the jaws $b$ are placed in their seats and the disk C secured in front of said jaws the power which moves them shall operate in line with the center of their bearing upon the article held between them.

By cutting the teeth $d$ in the outer surface of the jaws instead of in their inner surface, as in the jaws of the old scroll-chuck, I gain a material advantage, while in the old chuck the power which forces the jaws up to the article to be clamped is applied as far as possible from those points thereof which are particularly intended to take a firm hold of the article, and therefore said jaws are liable to tilt back and to bind in their guideways.

In my new chuck the power is applied as near as possible in line with the center of the bearing-points of the jaws, and when said jaws are forced up to the article to be clamped they are not liable to tilt or bind, and a comparatively small power is sufficient to hold said article perfectly firm and tight.

In the old chuck, after the same has been in use for a short time, the extreme points of the jaws are liable to spread, rendering the bearing-surfaces tapering, so that they clamp the articles to be held between them at their inner ends only; whereas, in my chuck the bearing-surfaces of the jaws remain parallel and in the proper condition to take a firm hold of the articles to be clamped.

The cap C is held in position by a projection on the head, and it is held down in its seat by a disk, D, which is secured to the head by screws or other suitable means. By turning the cap C the jaws are moved in or out, as may be requisite.

I claim as new and desire to secure by Letters Patent—

The combination of the head A with its disk D and scroll-collar C, with the jaws $c$, the latter provided on its outer surface with teeth, which engage the scroll of the collar, as described and represented.

A. F. CUSHMAN.

Witnesses:
M. M. LIVINGSTON,
C. L. TOPLIFF.